W. H. WEST.
PEANUT DIGGER.
APPLICATION FILED DEC. 18, 1917.

1,268,902.

Patented June 11, 1918.

Inventor
WADE H. WEST
By Watson E. Coleman
Attorney

UNITED STATES PATENT OFFICE.

WADE H. WEST, OF PANDORA, TEXAS.

PEANUT-DIGGER.

1,268,902.

Specification of Letters Patent. Patented June 11, 1918.

Application filed December 18, 1917. Serial No. 207,737.

*To all whom it may concern:*

Be it known that I, WADE H. WEST, a citizen of the United States, residing at Pandora, in the county of Wilson and State of Texas, have invented certain new and useful Improvements in Peanut-Diggers, of which the following is a specification, reference being had to the accompanying drawings.

This invention relates to certain improvements in peanut diggers and it is an object of the invention to provide a device of this general character whereby the plow or digging implement passes under the peanuts and cuts off the tap roots.

It is also an object of the invention to provide a novel and improved device of this general character wherein the plow or digging implement is concavo-convex and is supported or positioned in such a manner as to penetrate the ground or soil sufficiently to pass under the peanuts, which grow near the surface, and to sever the tap roots as the device is drawn forwardly which results in the preservation of the soil as the soil does not lose the nitrogen contained within the roots.

The invention consists in the details of construction and in the combination and arrangement of the several parts of my improved peanut digger whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings wherein:—

Figure 1:
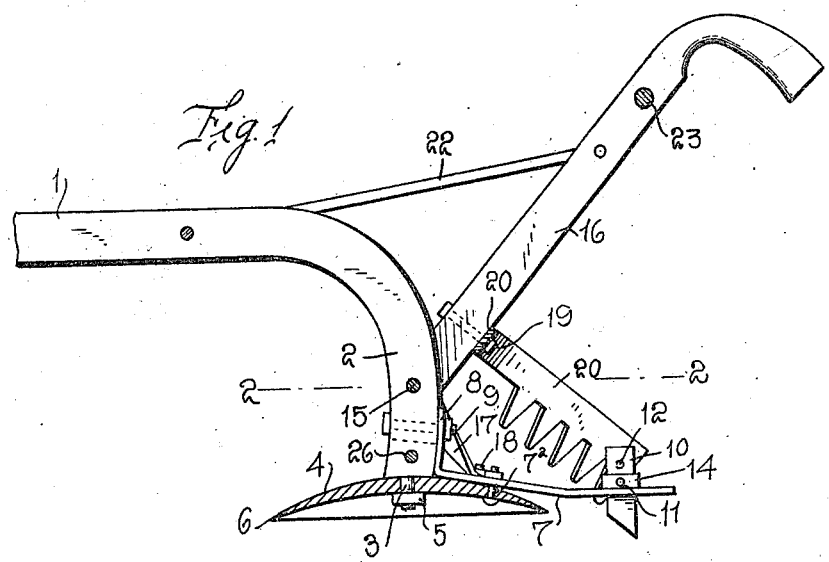
Figure 1 is a view partly in side elevation and partly in section illustrating a peanut digger constructed in accordance with an embodiment of my invention.
Figure 2:
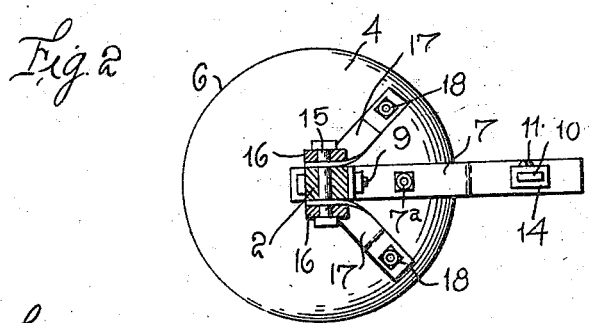
Fig. 2 is a sectional view taken substantially on the line 2—2 of Fig. 1, the side wings being omitted.

As disclosed by the accompanying drawings, 1 denotes a beam provided at one end with a depending standard or sheth 2 and the lower or free end of said standard or sheth has extending therebeyond a threaded shank 3 adapted to be disposed through the axial center of the plow or digging implement 4. The plow or digging implement 4 is maintained in applied position through the medium of the nut 5 threaded upon the shank 3 and coacting in a conventional manner with the plow or element 4.

The plow or element 4 is concavo-convex with its convex surface upwardly directed. The plow or implement 4 is preferably a substantially horizontally disposed disk and has its margin formed into a cutting edge 6.

Overlying the rear portion of the plow or implement 4 and in the same longitudinal plane as the beam 1 is an arm 7 extending a predetermined distance rearwardly of the plow or implement 4. The forward end portion of the arm 7 is provided with an upstanding extension 8 secured as at 9 to the rear face of the standard or sheth 2. The arm 7 is secured as at 7ª to the plow or implement 4 whereby said arm 7 serves as a support and reinforcement therefor. Disposed through the rear or free end portion of the arm 7 is the vertically directed knife 10 held in applied position through the medium of the pin 11 or the like, extending through an opening 12 in the knife 10 and through the longitudinal portions of an upstanding flange 14 defining an opening in the arm 7 through which the knife is directed.

Secured to the standard or sheth 2 through the medium of the bolt 15 and at a predetermined distance above the lower end portion of said standard or sheth 2 are the lower extremities of the upwardly and rearwardly directed handle members 16. Also engaged with the opposite end portions of the bolt 15 are the brace members 17 which extend downwardly and laterally and have their lower extremities suitably anchored as at 18 to the rear portion of the plow or digging implement 4 whereby additional support is afforded the plow or implement 4.

Underlying the lower end portions of the handle members 16 and secured thereto as at 19 is a plate 20 having its opposite end portions downwardly and outwardly directed to afford the deflecting wings 20 and the lower longitudinal marginal portions of said wings are provided with the depending teeth 21 for a purpose to be hereinafter more particularly referred to.

Coacting with each of the handle members 16 and the beam 1 is a brace rod 22, and the upper end portions of the handle members 16 are connected in the conventional manner by the cross rod 23.

Figure 3:
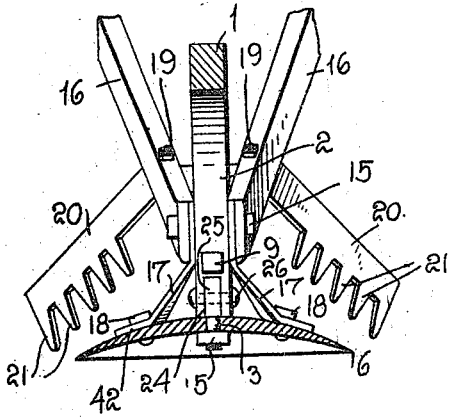
Fig. 3 is a view partly in front elevation and partly in section of my improved digger as herein disclosed.

While the threaded shank 3 may be secured to the lower end portion of the standard or sheth 2 in any manner desired, I prefer to employ the arrangement disclosed particularly in Fig. 3 wherein the lower end portion of said standard or sheth 2 is bifurcated to afford a kerf 24 in which snugly fits the head 25 arranged at the upper end of the shank 3 and disposed through the standard or sheth 2 and the head 25 is a holding member 26.

In operation the plow or digging element 4 is caused to penetrate the ground or soil sufficiently to pass under the peanuts, which grow near the surface and as the device is drawn forward, the tap roots are severed by the cutting edge 6 and the concavo convex formation of the plow or digging element will result in the elevation of the peanuts and the severed vines. The wings 21 operate to throw the vines to opposite sides of the rows while the depending teeth 21 of said wings readily permit the passage therebetween of the soil so that the possibility of choking is eliminated. The depending knife 11 penetrates the soil sufficiently to serve as a guide for the proper travel of the device and also serves to separate or sever the vines when necessary to facilitate the wings 20 performing their function.

From the foregoing description, it is thought to be obvious that a peanut digger constructed in accordance with my invention is particularly well adapted for use by reason of the convenience and facility with which it may be assembled and operated and it will also be obvious that my invention is susceptible of some changes and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a sheth, a substantially horizontally disposed disk secured to the lower end of the sheth, and a bracing means coacting with the sheth and the rear portion of the disk.

2. In combination with a sheth, a substantially horizontally disposed disk secured to the lower end of the sheth, a bracing means coacting with the sheth and the rear portion of the disk, said bracing means extending rearwardly of the disk, and an earth penetrating member carried by the extended portion of the bracing means.

3. In combination with a beam provided with a sheth, a concavo-convex digging element secured to the lower end of the sheth, and a brace member coacting with the sheth and rear portion of the digging implement.

4. In combination with a beam provided with a sheth, a concavo-convex digging element secured to the lower end of the sheth, a brace member coacting with the sheth and rear portion of the digging implement, said brace member extending rearwardly of the digging implement, and a knife carried by the extended portion of the brace member.

5. In combination with a beam provided with a sheth, a concavo-convex digging element secured to the lower end of the sheth, and downwardly and outwardly directed wings extending rearwardly of the sheth.

6. In combination with a beam provided with a sheth, a concavo-convex digging element secured to the lower end of the sheth, and downwardly and outwardly directed wings extending rearwardly of the sheth, the lower marginal portions of said wings being provided with teeth.

In testimony whereof I hereunto affix my signature in the presence of two witnesses.

WADE H. WEST.

Witnesses:
G. C. McMAINS,
W. W. SPEAR.

Copies of this patent may be obtained for five cents each, by addressing the "Commissioner of Patents, Washington, D. C."